(12) United States Patent
Kohli

(10) Patent No.: US 6,586,092 B2
(45) Date of Patent: Jul. 1, 2003

(54) CARDABLE FIBER BLEND

(75) Inventor: Anil Kohli, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 195 days.

(21) Appl. No.: 09/681,933

(22) Filed: Jun. 28, 2001

(65) Prior Publication Data

US 2001/0053825 A1 Dec. 20, 2001

Related U.S. Application Data

(62) Division of application No. 09/401,695, filed on Sep. 23, 1999, now abandoned.

(51) Int. Cl.⁷ .............................. D02G 3/00; D04H 1/00
(52) U.S. Cl. ...................... 428/362; 428/359; 442/414; 442/415
(58) Field of Search ................................ 428/359, 362; 442/414, 415

(56) References Cited

U.S. PATENT DOCUMENTS

| | | |
|---|---|---|
| 4,112,168 A | 9/1978 | Schafft |
| 4,359,132 A | 11/1982 | Parker et al. |
| 4,440,819 A | 4/1984 | Rosser |
| 4,847,140 A * | 7/1989 | Jaskowski .................. 428/220 |
| 4,957,794 A | 9/1990 | Bair |
| 5,102,729 A | 4/1992 | Yamaguchi et al. |
| 5,275,875 A * | 1/1994 | Suh et al. .................. 442/334 |
| 5,639,324 A | 6/1997 | Biggs et al. |

FOREIGN PATENT DOCUMENTS

| | | |
|---|---|---|
| EP | 0 354 288 | 2/1990 |
| EP | 0 385 543 | 9/1990 |
| GB | 2 037 122 B | 10/1979 |

* cited by examiner

*Primary Examiner*—Terrel Morris
*Assistant Examiner*—Jenna-Leigh Befumo

(57) ABSTRACT

The present invention provides a cardable fiber blend which forms a moldable fiber batt, the blend comprising fibers having a modulus of 550 g/denier or more with fibers of a thermoplastic polymer wherein the high modulus polymer fibers are all uncrimped fibers or a mixture of crimped and uncrimped fibers. The moldable batt is useful in making speaker cones.

5 Claims, No Drawings

CARDABLE FIBER BLEND

BACKGROUND OF THE INVENTION

Methods for forming fiber batts require the use crimped fibers because uncrimped fibers are very difficult if not impossible to process through textile equipment. In some applications such as speaker cones, high modulus fibers are used in making the cone because these fibers stiffen and improve sound reproduction. Before the present invention, it was necessary to crimp these high modulus fibers before they could be processed to form batts or felts. In the crimping process these stiff fibers are broken and damaged. Fiber is also lost or wasted contributing to an increased in cost for such crimped fibers. Even if no fiber were lost or damaged in crimping, the need for this step, alone, adds both processing time and costs in the production of batts and the products made from these batts.

Speaker cones are generally made from a paper or from a felt. Papers are non-woven webs produced by a wet lay process on paper machines, while non-woven felts are produced from fiber batts that are needled together.

U.S. Pat. No. 4,112,168 teaches a speaker cone produced by impregnating a fiber web with a resin solution, evaporating the solvent to produce a non-woven fabric and then simultaneously laminating to this fabric a gas tight film while molding the fabric into the speaker cone.

In another patent, U.S. Pat. No. 4,359,132, a speaker cone is produced by forming a needled felt from ptextile fibers and polypropylene textile fibers. Textile fibers are crimped fibers that allow easy processing through textile equipment.

British Patent 2 037 1 22 B teaches a speaker cone made of a paper formed on a paper machine from stiff fibers such as p-aramid or carbon fibers.

An object of the present invention is to provide a easily moldable batt using uncrimped high modulus polymer fibers. Such a bat may be molded into high quality speaker cones.

Another object in the present invention is to provide a cardable fiber blend from which the moldable batt may be formed.

Another object of the present invention is to provide a process for producing a fiber batt that does not require crimped high modulus fiber.

Another object of the present invention is to provide a high quality speaker cone and a process for making this speaker cone.

SUMMARY OF INVENTION

The present invention provides an intimate, cardable blend comprising crimped thermoplastic fibers and uncrimped high modulus polymer fibers. It is preferred that the thermoplastic fibers are polyolefin fibers and that the high modulus fibers have a modulus of at least 550 g/denier. It is also preferred that the high modulus fibers are selected from the group consisting of p-aramid, aromatic polyester fibers.

A second embodiment of the present invention is a batt formed from this intimate, cardable blend of fibers.

The present invention also provides a process for forming a fiber batt comprising the steps of:(a) blending together uncrimped high modulus polymer fibers having a modulus of 550 g/denier or more with fibers of a thermoplastic,(b) passing the blend through a device to open the fibers, and(c) forming the fibers into a batt.

In this process it is preferred that the high modulus polymer fibers are selected from the group consisting of p-aramid and aromatic polyester fibers.

In particular it is preferred that the crimped thermoplastic fibers are polyolefin or polyester fibers. For the high modulus polymer fibers, fibers that have a modulus greater than 750 g/denier are particularly preferred. It is also preferred that the batt formed in the present process contains from about 30% to about 70% by weight of high modulus polymer fibers and from about 70% to about 30% by weight crimped thermoplastic fibers.

The present process can be used to produce a molded fiber product when after step (c), the batt is molded in a high temperature, high pressure mold. The batt formed by the present process is particularly suited to be molded to form a speaker cone.

The batt and the molded product made from this batt may be the natural color of the polymer fibers or may be colored to a desired hue and shade by selecting the fibers from the group consisting of natural colored thermoplastic polymer fibers, natural colored high modulus polymer fibers, colored thermoplastic polymer fibers and colored high modulus polymer fibers.

The present invention also provides an improved process for forming a speaker cone comprising the steps of:(a) blending together high modulus polymer fibers having a modulus of 550 g/denier or more with fibers of a thermoplastic polymer, (b) passing the blend through a device to open the fibers, (c) forming the fibers into a batt,(d) heating a mold to about 200° F. and placing the batt in the mold to form a speaker cone,(e) applying a pressure of from 5 to 20 tons to the mold and heating the mold to about 380° F.,(f) allowing the mold to cool to about 200° F. before opening the mold to remove the speaker cone.

In this improved process, it is desirable that the high modulus polymer fibers are selected from the group consisting of p-aramid and aromatic polyester fibers and that the crimped thermoplastic fibers are polyolefin or polyester fibers. High modulus fibers having a modulus of at least 750 g/denier are particularly preferred. It is also desirable that the batt formed contains from about 30% to about 70% by weight of high modulus polymer fibers and from about 70% to about 30% by weight crimped thermoplastic fibers. Also in this process during molding the batt, a polyolefin film can be laminated to at least one face of the batt. The term polyolefin film as used herein also includes fibrous thin layers such as webs or batts and other terms used to describe thin layers of polyethylene. For speaker cones it is particularly desirable that the high modulus fibers are all uncrimped p-aramid fibers and the thermoplastic fiber is polypropylene.

The present invention provides a moldable fiber batt comprising fibers having a modulus of 550 g/denier or more with fibers of a thermoplastic polymer wherein the high modulus polymer fibers are all uncrimped fibers or a mixture of crimped and uncrimped fibers. It is preferable that the high modulus fibers are selected from the group consisting of p-aramid, and fibers and that the crimped thermoplastic fibers are polyolefin or polyester fibers or a mixture of these fibers. Polymer fibers having a modulus greater than 750 g/denier are particularly preferred for use as the high modulus fiber. It is particularly desirable that the high modulus polymer fibers are all uncrimped p-aramid fibers and the thermoplastic polymer fibers are polypropylene.

DETAILED DESCRIPTION

The present invention provides an intimate, cardable fiber blend that may be formed into a batt. This fiber batt is particularly useful in making speaker cones.

As used herein, the term high modulus polymer fiber means a fiber that has a modulus of 550 g/denier or more. High modulus polymer fibers that are particular useful in the present invention include p-aramid and aromatic polyester fibers. Such fibers having a modulus of 750 g/denier or more are particularly preferred. In processing the uncrimped high modulus fibers, the rate of carding may be increased by mixing into the uncrimped high modulus fiber an amount of crimped high modulus fiber.

When speaker cones are the desired product, it is recommended that the amount of crimped high modulus fiber present in a mixture with uncrimped high modulus fiber be less than 50% of the total weight of the mixture of crimped and uncrimped high modulus fiber.

It is believed that the use of uncrimped high modulus fiber is of particular advantage for speaker cones. The presence of uncrimped high modulus fiber produces a cone that, at least when rated subjectively, produces an improved sound reproduction, particularly of the human voice. Thus it is most desirable to use all uncrimped high modulus fiber. The mixing of crimped and uncrimped high modulus fiber as described above allows one to balance sound reproduction quality and rate of carding while realizing benefits from the use of uncrimped high modulus fiber in the cone.

The cardable fiber blend and the fiber batt of the present invention may be used for other purposes than making a speaker cone or other molded product. The batt itself may be used in insulation or for padding.

Since the batt of the present invention contains thermoplastic polymer fiber, the batt may be designed through polymer fiber selection to be easily moldable over a range of temperatures, or to be stable over a range of temperatures. For a moldable fiber batt, polyolefin, polyester and polyphenylene sulfide fibers are useful. Polypropylene fibers are most desirable for use in making speaker cones.

The present invention provides a process for making a fiber batt using a blend of crimped and uncrimped fibers. Synthetic polymer fibers are crimped so that they process as natural fibers and can be processed to form batts, webs and fabrics using textile equipment. There is the advantage of eliminating a process step, if uncrimped synthetic polymer fibers could be directly formed into a web or batt.

The inventor in the present invention has found that by combining thermoplastic crimped polymer fibers and uncrimped high modulus polymer fibers, a combination of fibers is formed that can be processed by textile equipment to form a batt or web. Even when a high concentration of the uncrimped fiber is present, the fiber blend of the present invention can be processed using, for example, a Rando Webber or other equipment for forming a web or batt.

In the present process the thermoplastic polymer fibers and the high modulus fibers are opened. Each fiber type may be opened separately and then combined to feed the webber or card, or the two types of fibers can be first blended together, then opened and the opened blend is then fed to the webber or card.

Card rates can be increased by using a mixture of uncrimped and crimped high modulus fibers along with the thermoplastic polymer fibers. Generally for blends of the present invention, it is recommended that the amount of crimped high modulus fiber be present in an amount of not more than 50% of the total weight of the mixture of crimped and uncrimped high modulus fiber.

The weight range preferred for batts for the present invention is from 0.5 to about 7 oz./yd$^2$. Batts may be made at a desired weight by forming that weight directly at the card or webber, or they may be made by laminating lighter weight batts together to give the desired weight. This latter method is useful in molding speaker cones since single thickness batts tend to wrinkle in the molding process. Also in producing batts for molding, it is preferred that the batt be of low density. To achieve a low density batt, it is preferred to produce the batt using blower air-ducted or vacuum air duct process equipment, for example, a Rando Webber.

In selecting fibers for the present process, it is preferred that that the high modulus fibers are selected from the group consisting of p-aramid, aromatic polyester, poly phenylene sulfide and aromatic polyimide fibers and that the crimped thermoplastic fibers are polyolefin or polyester fibers or a mixture of these fibers. It is particularly desirable that the high modulus polymer fibers are all uncrimped p-aramid fibers and the thermoplastic polymer fibers are polypropylene.

The batt of the present invention may be molded into desired shapes if after step (c), the batt is molded in a high temperature, high pressure mold.

If one desires to mold speaker cones from the batts of the present invention, high quality speaker cones may be made using the following improved process: (a) blending together high modulus polymer fibers having a modulus of 550 g/denier or more with fibers of a thermoplastic polymer wherein the high modulus polymer fibers are all uncrimped fibers,(b) passing the blend through a device to open the fibers, (c) forming the fibers into a batt,(d) heating a mold to about 200° F. and placing the batt in the mold to form a speaker cone,(e) applying a pressure of from 5 to 20 tons to the mold and heating the mold to about 380° F.,(f) allowing the mold to cool to about 200° F. before opening the mold to remove the speaker cone.

In this improved process it is desirable that the high modulus polymer fibers are selected from the group consisting of p-aramid, aromatic polyester, poly phenylene sulfide and aromatic polyimide fibers and that the crimped thermoplastic fibers are polyolefin or polyester fibers or a mixture of these fibers. It is also desirable that the batt formed contains from about 30% to about 70% by weight of high modulus polymer fibers and from about 70% to about 30% by weight crimped thermoplastic fibers. Also in this process during molding the batt a polyolefin film can be laminated to the batt. For speaker cones it is particularly desirable that the high modulus fibers are all uncrimped p-aramid fibers and the thermoplastic fiber is polypropylene.

In the molding process the speaker cone may be colored by selecting the fibers, both the thermoplastic polymer and the high modulus fibers, from fibers either natural colored thermoplastic polymer fibers, natural colored high modulus polymer fibers, colored thermoplastic polymer fibers and colored high modulus polymer fibers. Combinations of the natural colored p-aramid fiber, for example which is yellow with either colored or natural colored polypropylene fibers all some latitude in formulation a desired hue and shade. A second method by which the speaker cones of the present invention may be colored is to laminate a thin film of the thermoplastic polymer colored to the desired hue and shade to the speaker cone surface during the molding step. This second method of producing a color offers a wide possibility of both hue and shade in a speaker cone product.

The present invention is illustrated by the following non-limiting examples.

EXAMPLE 1

Uncrimped KEVLAR 49 brand poly p-phenylene terepthalamide fiber produced by E.I. du Pont de Nemours and Company of Wilmington, Del., and having a nominal tensile modulus 885 gms/denier, a nominal breaking tenacity 23.6 gms/denier in ¼" cut length and a 1.5 denier was preopened by using a vacuum air duct system. (KEVLAR is a trademark of E.I. du Pont de Nemours and Company).

Crimped polypropylene fibers having a 1.5" cut length and 1.5 denier were pre-opened by passing them through the Rando Opener. These two fibers were blended in a ratio of 50/50 by weight using the vacuum air duct system. Blends were processed through the Rando Opener three times followed by running two times through the Rando Webber to produce non-woven batts. These webs were rolled using cellophane or paper as the liner. Batts of the following weights were produced 2.5, 3.5 and 4.5 oz./yd$^2$. In several cases steam was used in the Rando Webber for improved processing.

The webs or batts were then die cut or layered and die cut into pieces of about 6" diameter for molding into cones. The desired mold was installed into a high temperature press and heated using band heaters to 380° F. The die cut sample was placed between the two halves of the molds, and the press was closed to a molding pressure of from 5 to 20 tons. After about 20 seconds, the cold water was circulated to cool the mold to about 150° F. The press was opened and the part removed.

These cones were assembled into speakers and compared with paper and polypropylene cones. In key listening tests, these cones provided superior acoustic performance particularly higher sensitivity and lower distortion than the controls.

EXAMPLE 2

Uncrimped KEVLAR 149 brand poly pterephthalamide fibers having a tensile modulus 1000 gms/denier, breaking tenacity 21 gms/denier and cut length ¼" were blended with polypropylene fibers and formed into a batt according to Example 1. These batts were also molded into cones.

The cones were yellow in color, because of the natural color of K149 and the natural white color of the polypropylene fibers.

EXAMPLE 3

Uncrimped natural yellow color KEVLAR 149 brand fibers were blended with black color polypropylene, resulting in a greenish color batt. This batt was molded into cones that have marble green look to them.

EXAMPLE 4

The dark blue colored KEVLAR 49 brand fibers were blended with black polypropylene fibers, resulting in a dark bluish black batt. This batt, together with layers of black polypropylene placed on each face of the batt, were placed in the mold and processed. Darker colored cones were produced.

EXAMPLE 5

A speaker cone was molded in the improved process of the present invention by heat the mold to 200° F., placing batt made according to Example 1 between the molds and closing the press and applying 10–20 tons pressure. The mold was then heated to 380° F.; and after a hold time of about 10 minutes, the mold was cooled down to about 200° F. The press was then opened and the cone removed. The quality and uniformity of this cone was very high because of intimate blending of polypropylene and p-aramid fibers in the formation of the batt in this molding process.

What is claimed is:

1. An intimate, cardable blend comprising crimped thermoplastic fibers and fibers selected from the group consisting of uncrimped high modulus polymer fibers or a mixture of uncrimped and crimped high modulus polymer.

2. The blend of claim 1 wherein in the mixture of uncrimped and crimped high modulus fibers the crimped fiber represents less than about 50% by weight of the mixture.

3. The blend of claim 1 wherein the thermoplastic fibers are polyolefin fibers and the high modulus fibers have a modulus of at least 550 g/denier.

4. The blend of claim 1 wherein the high modulus fibers are selected from group consisting of p-aramid aromatic polyester fibers.

5. The blend of claim 1 wherein the high modulus fibers have a modulus of 750 g/denier or more.

* * * * *